United States Patent [19]

Mori et al.

[11] 4,144,113

[45] Mar. 13, 1979

[54] ADHESIVE COMPOSITION

[75] Inventors: Atsuo Mori, Takatsuki; Taisuke Okita, Ibaraki; Shuji Kitamura; Kozo Kotani, both of Toyonaka; Masaaki Hama, Takatsuki, all of Japan

[73] Assignee: Sumitomo Chemical Company, Limited, Osaka, Japan

[21] Appl. No.: 807,613

[22] Filed: Jun. 17, 1977

Related U.S. Application Data

[63] Continuation of Ser. No. 610,709, Sep. 5, 1975, abandoned.

[30] Foreign Application Priority Data

Sep. 5, 1974 [JP] Japan ................................ 49-102805

[51] Int. Cl.$^2$ ................................................ C08K 3/16

[52] U.S. Cl. ................................. 156/334; 260/42.43; 260/42.52; 526/4

[58] Field of Search ........................... 156/334; 526/4; 260/42.28, 42.43, 42.46, 42.52

[56] References Cited

U.S. PATENT DOCUMENTS 3,764,458  10/1973  Ziegel ................................. 156/334

Primary Examiner—Paul R. Michl
Attorney, Agent, or Firm—Sughrue, Rothwell, Mion, Zinn and Macpeak

[57] ABSTRACT

An adhesive composition comprising (1) a polyolefin having therein at least one repeating unit containing a carbonyl group and (2) at least one of calcium chloride, magnesium chloride or a mixture thereof.

7 Claims, No Drawings

ADHESIVE COMPOSITION

This is a continuation of application Ser. No. 610,709 filed Sept. 5, 1975, now abandoned.

BACKGROUND OF THE INVENTION

1. Field of the Invention

This invention relates to an adhesive composition comprising polyolefins containing carbonyl groups and calcium chloride and/or magnesium chloride which provides improved waterproof and chemical-resistant adhesion between a metal and a polyolefin.

2. Description of the Prior Art

It has been a wide practice, as one method of preventing the corrosion of metals, to coat the surface of the metals with resins. Polyolefin resins such as polyethylene or polypropylene and polyvinyl chloride, for example, have been used for this purpose. From the standpoint of resistance to brittleness at low temperatures and food sanitation, a coating of polyethylene has especially been desired in many types of industries.

However, since polyethylene is non-polar, it is difficult to adhere polyethylene directly to a metal. Therefore, the adhesion of polyethylene to a metal has been increased by subjecting the polyethylene to a corona discharge treatment or by using an adhesive. As adhesives for adhering polyolefins to metals, ethylene copolymers containing polar groups (e.g., ethylene/vinyl acetate copolymers and polyethylene containing chlorosulfonic acid groups) are widely used.

These adhesives are superior in adhering polyolefins to metals, but almost all of them have defects in waterproof adhesiveness. When a metal is completely coated with a resin, the waterproofness of the adhesive scarcely poses a problem because the adhesive does not come into contact with water unless the resin coating breaks. However, in actual use of the coated metal, frequently the coated resin breaks and the base metal is exposed because of pinholes formed during the production of the resin, due to cutting, welding and thread-cutting operations conducted during the processing of the coated metals, or as a result of impact after processing. When the waterproof adhesiveness of the adhesive is poor, the coated resin peels off within short periods of time, and the corrosion protection of the metal is destroyed.

Chlorosulfonated polyethylene is now in use as a feasible waterproof adhesive for adhering polyolefins to metals. However, this adhesive has the defect that because of its poor heat stability, the temperature range at which it can be utilized is very narrow, and the handling of the adhesive is difficult. Further, since the synthesis of this adhesive requires complicated procedures, it is higher in cost than other adhesives of a similar nature. Some polyolefins containing polar groups exhibit equal or superior salt water-resistant adhesiveness to chlorosulfonated polyethylene, but a polyolefin containing polar groups which excels chlorosulfonated polyethylene both in salt water-resistant adhesiveness and salt crock-resistant adhesiveness has never been obtained.

In an attempt to improve the salt crock-resistant and salt water-resistant adhesive properties of ethylene copolymers containing a polar group, organic and inorganic additives have been extensively studied, and consequently it has now been found that only calcium chloride and magnesium chloride unexpectedly provide striking effects. Accordingly, this invention provides an adhesive composition comprising (1) a polyolefin having therein at least one repeating unit containing a carbonyl group and (2) at least one of calcium chloride, magnesium chloride or a mixture thereof.

DETAILED DESCRIPTION OF THE INVENTION

Various organic and inorganic compounds have in fact been used heretofore in the art to improve the waterproof adhesiveness of adhesives, but calcium chloride and magnesium chloride, partly because of their deliquescent nature, have never been used as additives for improving the waterproof adhesiveness of adhesive compositions. Calcium and magnesium compounds other than the chlorides do not exhibit any effect in improving the salt water-resistant and salt crock-resistant adhesive properties of polyolefins containing carbonyl groups.

It was quite unexpected that the chemical (e.g., hydrochloric acid, sodium hydroxide)-resistant adhesiveness of polyolefins containing carbonyl groups can be improved by adding calcium chloride and/or magnesium chloride to a polyolefin containing carbonyl groups.

Polyolefins containing carbonyl groups which can be used in this invention can be any of those which are adhesive to metals or glass, and specific examples include (1) polyolefins (e.g., high density-, medium density-, low density-polyethylene, polypropylene, or a block or rubbery copolymer of ethylene and propylene) modified with an acid anhydride (e.g., maleic anhydride) and (2) bi- or multi-component copolymers of ethylene and ethylenically unsaturated monomers containing a carbonyl group, and the saponified products thereof.

Examples of suitable ethylenically unsaturated monomers include vinyl esters containing 2 to 6 carbon atoms in the saturated carboxylic acid components (e.g., vinyl acetate, and vinyl propionate); vinyl benzoate; acrylate or methacrylates containing 1 to 18 carbon atoms in the saturated alcohol component (e.g., methyl-, ethyl-, propyl-, butyl-, 2-ethylhexyl-, cyclohexyl-, dodecyl- and octadecyl-acrylate or methacrylate); maleic anhydride; mono- and di-maleates containing 1 to 18 carbon atoms in the saturated alcohol components (e.g., mono- or di-methyl, ethyl, butyl, cyclohexyl, 2-ethylhexyl, dodecyl, and octadecyl maleate); N-vinyl lactams (e.g., N-vinyl pyrrolidone and N-vinyl caprolactam); acrylamide compounds; secondary vinyl carboxylic acid amides; N-vinyl-N-alkylcarboxylic acid amides; and unsaturated glycidyl monomers (e.g., glycidyl methacrylate).

The polyolefin containing carbonyl groups can be used either individually or as a mixture thereof. Other synthetic resins or rubbery materials can be added to the polyolefins so long as the additional components do not impair the adhesive effects of the polyolefins. Also, other additives such as a heat stabilizer, a fire retarding agent, a filler, a coloring agent (pigment), a dispersing agent, an antistatic agent, a rustproofing agent, a lubricating agent, or a processing adjuvant can also be incorporated into the polyolefin containing carbonyl groups in amounts which do not impair the effect of the present invention.

The adhesive composition of this invention can be applied to various kinds of metals, such as steel, stainless steel, zinc-coated iron, tin-plated iron, pig iron, copper, brass, aluminum, electrolytically oxidized aluminum, and other conventional metal materials in suitable forms, such as sheets or tubes.

Polyolefins as coating materials to which the adhesive composition of this invention is to be applied include high density, medium density and low density polyethylene, polypropylene, a block or rubbery copolymer of ethylene and propylene, a copolymer of ethylene and butene-1, a ternary ethylene-propylene-diene rubbery copolymer, and copolymers composed of ethylene or propylene units as main units and units derived from a vinyl compound such as vinyl acetate, an acrylic acid ester and vinyl chloride. These polyolefins can be used either individually or as a mixture thereof. Mixtures of polyolefins with other synthetic resins or rubbery materials can also be used in this invention.

Additives such as a heat stabilizer, a fire retarding agent, a filler, a coloring material (pigment), a dispersing agent, an antistatic agent, a rustproofing agent, a lubricating agent or a processing adjuvant can also be incorporated into the polyolefin in amounts which do not adversely affect the advantages of this invention.

Calcium chloride and/or magnesium chloride can be added to the polyolefin containing carbonyl groups employing known kneading methods using, for example, a two-roll machine, Bambury mixer or an extruder. The composition can also be liquefied using a solvent which dissolves or disperses the polyolefin containing polar groups. The calcium chloride and/or magnesium chloride does not necessarily have to be soluble in the solvent, but can be suspended in a solvent or dispersion of the polyolefin in such a solvent. The resulting adhesive has been found to also exhibit the effects achieved on adding the calcium chloride and/or magnesium chloride.

The calcium chloride and magnesium chloride to be added to the polyolefin containing carbonyl groups can be used in an anhydrous or hydrated form. Specific examples of calcium chlorides and magnesium chlorides include anhydrous calcium (magnesium) chloride, calcium (magnesium) chloride monohydrate, calcium (magnesium) chloride dihydrate, calcium (magnesium) chloride hexahydrate and calcium (magnesium) chloride tetrahydrate. Of these, anhydrous calcium chloride is most effective. The particle size of the calcium chloride and/or magnesium chloride to be added is not more than about 1 mm from the standpoint of ease of kneading and coating operations, but depending upon the thickness of the adhesive layer, the particle size can be greater than about 1 mm. A preferred particle size is not more than 0.5 mm, and a particularly preferred particle size is 0.0001 to 0.2 mm.

A suitable amount of the calcium chloride and/or magnesium chloride to be added to the polyolefin containing carbonyl groups is about 0.01 to 70% by weight on the basis of the total weight of the composition. If the amount is less than about 0.01% by weight, the effect of addition is small, and if the amount exceeds about 70% by weight, uniform dispersion of the additive is difficult. Depending on the conditions of use, amounts outside this range are also feasible. The especially effective amount of these compounds is 0.1 to 20% by weight, and most preferably, 0.1 to 10% by weight, based on the total weight of the composition.

When the adhesive composition of this invention is solid, the composition can be applied to a base metal by pressing or extrusion coating. When the adhesive composition is in the form of a powder, the composition can be applied by electrostatic coating or by dipping in a fluidized bed. When the adhesive composition is liquid, the composition can be applied by spraying, dipping or brush coating. These coating methods are well known in the art.

The polyolefin coating can be coated by various known methods such as pressing, extrusion coating, electrostatic coating, or dipping in a fluidized bed simultaneously with or after the coating of the adhesive composition of this invention.

Various methods of testing the waterproof adhesiveness of resin-coated metals are known, but the following salt water-resistance testing and the salt crock-resistance testing shown below were used in the present invention. In Example 1 and Comparative Example 1, a test for chemical resistance was also performed.

The salt water-resistance testing was carried out by immersing a test piece of a resin-coated metal, in which a slit leading to the surface of the metal had been made, in a 3% by weight salt water solution at 60° C. for 10 days, and evaulating the resistance in terms of the area of the coated resin which was peeled off.

The salt crock-resistance testing was carried out by using the same test piece as a cathode and graphite as an anode, and passing a direct current of 3 V for 10 days through a 3% by weight salt water solution at room temperature (about 20°–30° C.), and evaluating the resistance in terms of the area of the coated resin which was peeled off.

The test for chemical resistance was carried out by immersing a resin coated steel plate, slit in the same way as for the test piece used in the salt water-resistance testing, in a chemical at room temperature for 10 days, and evaluating the resistance in terms of the area of the coated resin which was peeled off.

The following Examples and Comparative Examples are given to illustrate the present invention in greater detail. It should be understood that the invention is not in any way to be construed as being limited to these examples. All percents, parts, ratios and the like in these examples are by weight unless otherwise indicated.

EXAMPLE 1

5 g of anhydrous calcium chloride was mixed with 95 g of a vinyl acetate/ethylene copolymer (vinyl acetate content: 30 wt %; melt index (ASTM-1238-57T): 20 g/10 min.), and the mixture was kneaded using a two-roll machine with the rolls being held at 50° C. to form sheet-like thermofusible adhesive having a thickness of 1 mm. The resulting adhesive was interposed between a degreased iron sheet and a sheet of low density polyethylene (density (JIS-K6760-1966): 0.920 g/cm$^3$; melt index (ASTM-1238-57T): 7 g/10 min.), and the assembly was heated for 5 minutes at 200° C. under a pressure of 50 kg/cm$^2$.

The results of evaluations are shown in Tables 1 and 2. It is clear from these results that calcium chloride was very effective for improving the waterproof adhesiveness of the adhesive.

COMPARATIVE EXAMPLE 1

Using a 1 mm-thick sheet-like adhesive of a vinyl acetate/ethylene copolymer (vinyl acetate content: 30 wt %; melt index (ASTM-1238-57T): 20 g/10 min.) not containing anhydrous calcium chloride, polyethylene was bonded to an iron sheet in the same way as in Example 1.

The results of the evaluations made are also shown in Tables 1 and 2.

EXAMPLE 2

Polyethyene was bonded to an iron sheet in the same manner as in Example 1 except that a glycidyl methacrylate-ethylene copolymer (glycidyl methacrylate content: 12 wt %; melt index (ASTM-1238-57T): 2 g/10 min.) was used instead of the vinyl acetate/ethylene copolymer used in Example 1.

The results of evaluations made are shown in Table 1. It is clear from the results that calcium chloride was very effective in improving the waterproof adhesiveness of the adhesive.

COMPARATIVE EXAMPLE 2

Polyethylene was bonded to an iron sheet in the same way as in Example 2 using an adhesive of the same composition except that calcium chloride was not added to the adhesive. The results of the evaluations made are also shown in Table 1.

COMPARATIVE EXAMPLE 3

Polyethylene was bonded to an iron sheet in the same way as in Example 1 using an adhesive of the same composition except that the same amount of sodium chloride was used instead of the calcium chloride used in Example 1. The results of the evaluations made are also shown in Table 1.

COMPARATIVE EXAMPLE 4

Polyethylene was bonded to an iron sheet in the same way as in Example 1 using an adhesive of the same composition except that the same amount of calcium hydroxide was used instead of the calcium chloride used in Example 1. The results of the evaluations made are also shown in Table 1.

EXAMPLE 3

Polyethylene was bonded to an iron sheet in the same way as in Example 1 using an adhesive of the same composition except that the same amount of magnesium chloride was used instead of the calcium chloride used in Example 1. The results of the evaluations made are also shown in Table 1. It is clear from the results that magnesium chloride was very effective in improving the waterproof adhesiveness of the adhesive.

EXAMPLE 4

The adhesive composition of Example 1 was added to trichloroethylene in an amount of 20% and dissolved therein at 70° C. over the course of 1 hour. The calcium chloride was not dissolved, but was suspended in the trichloroethylene. The resulting suspension was coated on a degreased iron sheet and dried, and then a polyethylene sheet (density (JIS-K6760-1966): 0.920 g/cm$^3$; melt index (ASTM-1238-57T): 7 g/10 min.) was superimposed thereon. The assembly was heated for 5 minutes at 200° C. under a pressure of 50 kg/cm$^2$.

The results of the evaluations made are shown in Table 1. It is clear from the results that calcium chloride was very effective for improving the waterproof adhesiveness of the adhesive.

EXAMPLE 5

3 g of anhydrous calcium chloride having a particle diameter of less than 0.2 mm was mixed with 97 g of the same vinyl acetate/ethylene copolymer as described in Example 1. The mixture was kneaded and granulated in an extruder heated at 90° to 110° C. to form a thermofusible adhesive in the form of milk-white pellets. A 0.5 mm-thick sheet was prepared from the pellets, and using the sheet, polyethylene was bonded to an iron sheet in the same way as in Example 1.

The results of the evaluations made are shown in Table 1. It is clear that calcium chloride was very effective for improving the waterproof adhesiveness of the adhesive.

EXAMPLE 6

3 g of anhydrous calcium chloride having a particle diameter of less than 0.2 was mixed with 97 g mm an ethylene-ethyl acrylate copolymer (ethyl acrylate content: 18 wt %; melt index (ASTM-1238-57T): 20 g/10 min.). The mixture was kneaded and granulated using an extruder heated at 150° to 160° C. to form a thermofusible adhesive in the form of milk-white pellets. A 0.5 mm-thick sheet was prepared from the pellets, and polyethylene was bonded to an iron sheet with the adhesive in the same way as in Example 1.

The results of the evaluations made are shown in Table 1. It is clear that calcium chloride was very effective for improving the waterproof adhesiveness of the adhesive.

COMPARATIVE EXAMPLE 5

Polyethylene was bonded to an iron plate in the same way as in Example 6 using an adhesive of the same composition except that calcium chloride was not added to the adhesive. The results of the evaluations made are also shown in Table 1.

TABLE 1

| Run No. | Additive | Waterproof Adhesiveness Salt Water Test (cm$^2$) | Salt Crock Test (cm$^2$) |
|---|---|---|---|
| Example 1 | CaCl$_2$ | 0 | 0 |
| Comparative Example 1 | — | 4 | 36 |
| Example 2 | CaCl$_2$ | 0 | 0 |
| Comparative Example 2 | — | 49 | 32 |
| Comparative Example 3 | NaCl | 64 | 64 |
| Comparative Example 4 | Ca(OH)$_2$ | 32 | 64 |
| Example 3 | MgCl$_2$ | 1 | 1 |
| Example 4 | CaCl$_2$ | 0.5 | 1 |
| Example 5 | CaCl$_2$ | 0 | 0 |
| Example 6 | CaCl$_2$ | 1 | 0 |
| Comparative Example 5 | — | 50 | 36 |

TABLE 2

| Run No. | Chemical Resistance Adhesiveness 0.1N HCl (cm$^2$) | 0.1N NaOH (cm$^2$) | 0.1N NaClO$_3$ (cm$^2$) |
|---|---|---|---|
| Example 1 | 0.5 | 0.5 | 0.5 |
| Comparative Example 1 | 60 | 8 | 7 |

While the invention has been described in detail and with reference to specific embodiments thereof, it will be apparent to one skilled in the art that various changes and modifications can be made therein without departing from the spirit and scope thereof.

What is claimed is:

1. In a process for adhering materials using a film adhesive, the improvement comprising using as said adhesive an adhesive composition comprising (1) a copolymer of ethylene with an ethylenically unsaturated monomer containing a carbonyl group selected from the group consisting of vinyl acetate, vinyl propionate, vinyl benzoate, methyl-, ethyl-, propyl-, butyl-, 2-ethylhexyl-, cyclohexyl-, dodecyl- or octadecyl-acrylate or methacrylate, maleic anhydride, mono- or di-methyl, ethyl-, butyl-, cyclohexyl-, 2-ethylhexyl, dodecyl-, or octadecyl-maleate, N-vinyl pyrrolidone, N-vinyl caprolactam, acrylamide, a secondary vinyl carboxylic acid amide and glycidyl methacrylate and (2) at least one of calcium chloride, magnesium chloride or a mixture thereof.

2. The process according to claim 1, wherein the ethylenically unsaturated monomer is vinyl acetate, ethyl acrylate or glycidyl methacrylate.

3. The process according to claim 1, wherein the calcium chloride and the magnesium chloride are in the form of the anhydride or the hydrate thereof.

4. The process according to claim 1, wherein the calcium chloride is anhydrous calcium chloride.

5. The process according to claim 1, wherein the amount of the calcium chloride, the magnesium chloride or the mixture thereof ranges from about 0.01 to 70% by weight based on the total weight of said adhesive composition.

6. The process according to claim 5, wherein the amount of the calcium chloride, the magnesium chloride or the mixture thereof ranges from 0.1 to 20% by weight.

7. The process according to claim 6, wherein the amount of the calcium chloride, the magnesium chloride or the mixture thereof ranges from 0.1 to 10% by weight.

* * * * *